(12) United States Patent
Fischer et al.

(10) Patent No.: US 11,354,218 B2
(45) Date of Patent: Jun. 7, 2022

(54) GENERATION OF OPTIMAL PROGRAM VARIATION

(71) Applicant: SAP SE, Walldorf (DE)

(72) Inventors: Andreas Fischer, Walldorf (DE); Jonas Janneck, Walldorf (DE); Joern Kussmaul, Walldorf (DE); Nikolas Kraetzschmar, Walldorf (DE); Florian Kerschbaum, Walldorf (DE)

(73) Assignee: SAP SE, Walldorf (DE)

( * ) Notice: Subject to any disclaimer, the term of this patent is extended or adjusted under 35 U.S.C. 154(b) by 20 days.

(21) Appl. No.: 16/867,632

(22) Filed: May 6, 2020

(65) Prior Publication Data
US 2021/0349807 A1 Nov. 11, 2021

(51) Int. Cl.
| | |
|---|---|
| *G06F 9/44* | (2018.01) |
| *G06F 11/36* | (2006.01) |
| *G06F 8/71* | (2018.01) |
| *G06F 11/30* | (2006.01) |
| *G06F 21/14* | (2013.01) |
| *G06F 21/55* | (2013.01) |

(52) U.S. Cl.
CPC ............ *G06F 11/3612* (2013.01); *G06F 8/71* (2013.01); *G06F 11/302* (2013.01); *G06F 11/3672* (2013.01); *G06F 21/14* (2013.01); *G06F 21/556* (2013.01)

(58) Field of Classification Search
CPC ...... G06F 11/3612; G06F 8/71; G06F 11/302; G06F 11/3672; G06F 21/14; G06F 21/556
See application file for complete search history.

(56) References Cited

U.S. PATENT DOCUMENTS

| | | | | |
|---|---|---|---|---|
| 6,668,325 | B1 * | 12/2003 | Collberg | ............... G06F 21/14 713/194 |
| 2015/0373036 | A1 * | 12/2015 | Patne | ................... G06F 21/755 726/23 |
| 2020/0151305 | A1 * | 5/2020 | Lam | ........................ G06F 8/41 |

OTHER PUBLICATIONS

Almeida et al. ("Formal verification of side-channel countermeasures using self-composition." Science of Computer Programming 78.7 (2013): p. 796-812).*

* cited by examiner

*Primary Examiner* — Hang Pan
(74) *Attorney, Agent, or Firm* — Buckley, Maschoff & Talwalkar LLC

(57) ABSTRACT

Provided is a system and method for generating a subset of optimal variations of a software program which allow some statements of the control flow to be exposed to side channels. Furthermore, the subset of optimal variations may be selected based on a security and a performance trade-off analysis. In one example, the method may include identifying a set of statements within a control flow of a software program, generating a plurality of variations of the software program which comprise different subsets of statements which are exposed to side channels, respectively, determining one or more pareto-optimal variations of the software program based on side channel leakage values and performance values of the plurality of variations of the software program, and outputting information about the one or more pareto-optimal variations of the software program to a user device.

20 Claims, 8 Drawing Sheets

FIG. 2A
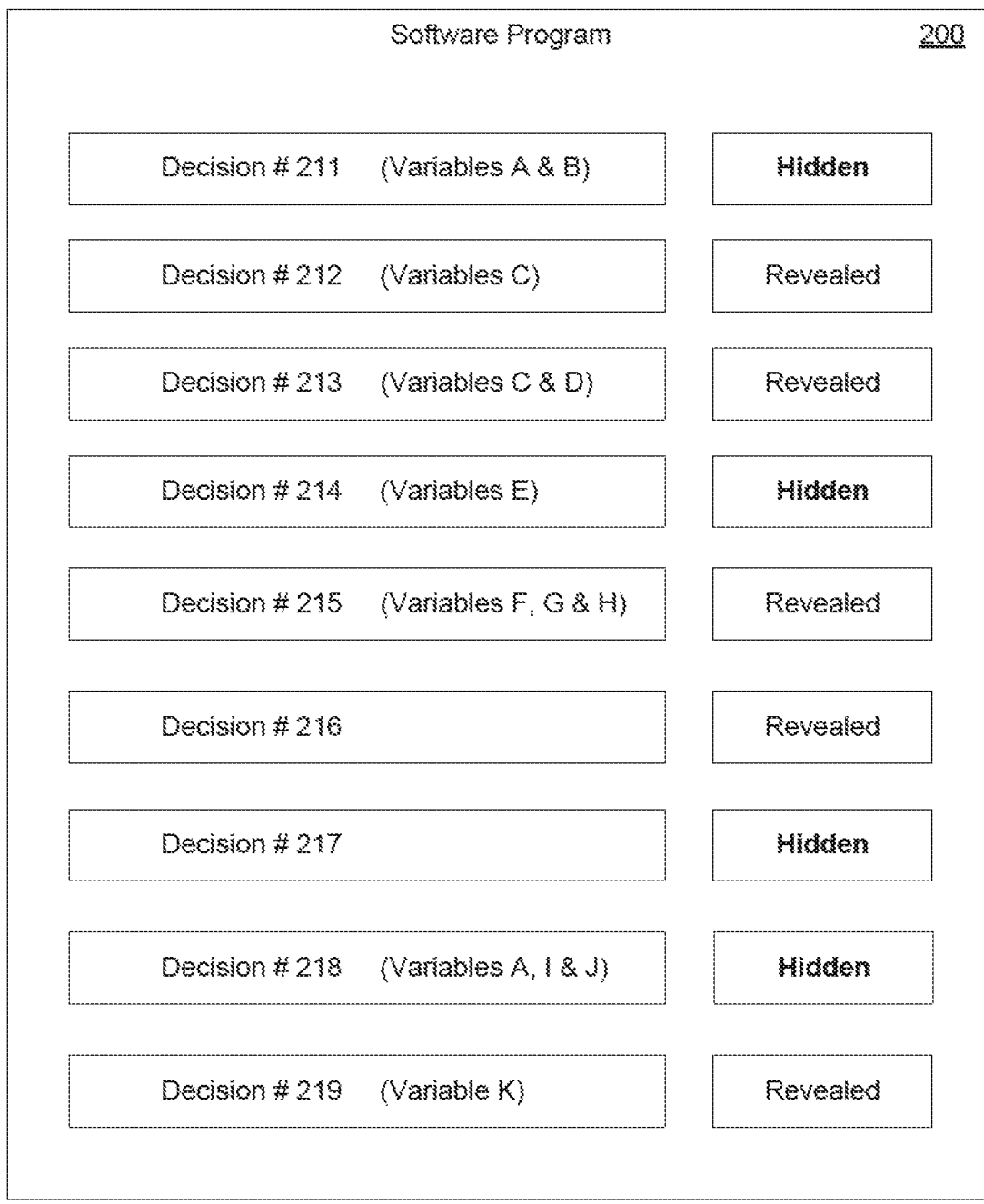
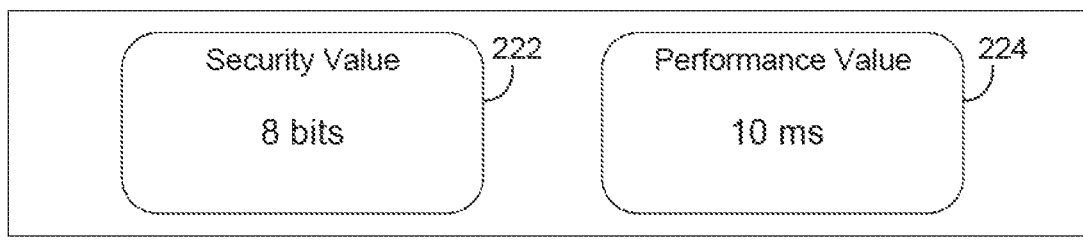

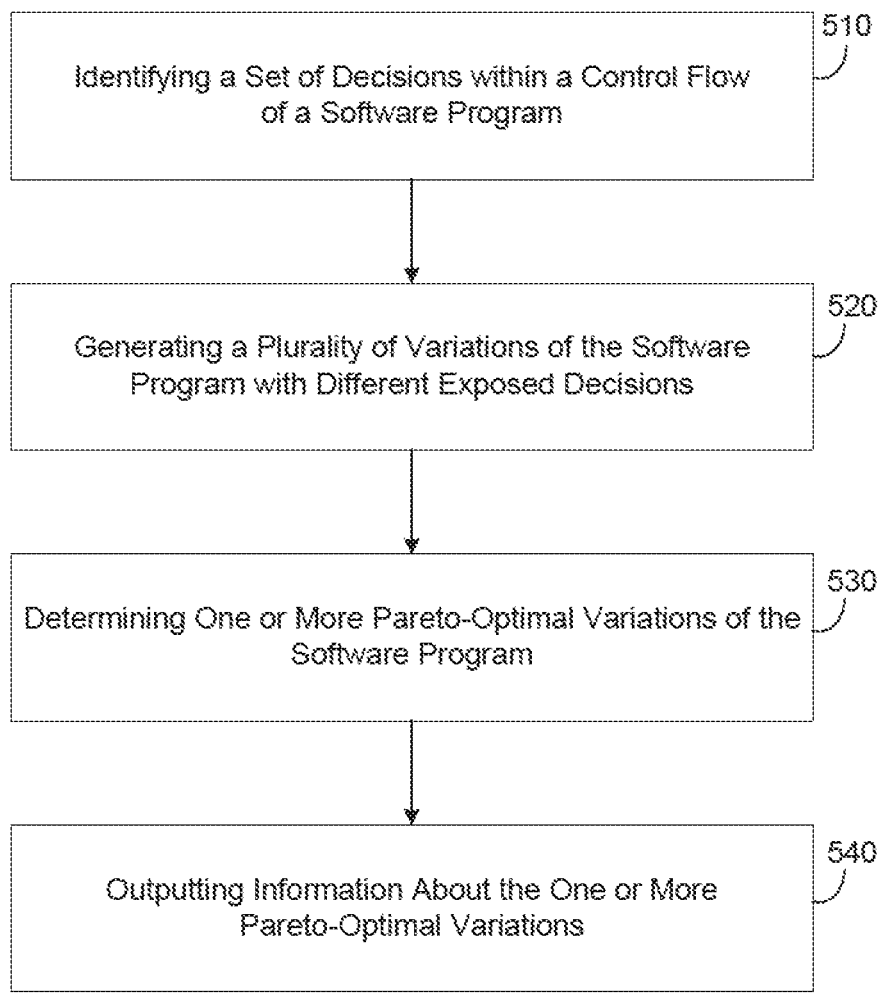

GENERATION OF OPTIMAL PROGRAM VARIATION

BACKGROUND

Cloud services provide on-demand access to cost-efficient computing resources such as data storage and computing power. Often, cloud services are available over public networks. As a result, data in the cloud may be at risk of theft from malicious users observing the cloud via side channels. For example, through side channels, unauthorized users (e.g., service providers, other users, etc.) may learn information about data files being stored, usage of the data files, usage of services, and the like. As another example, a cloud provider may be hacked by a malicious user. To ensure confidentiality of the data, encryption can be applied to the data prior to transferring it to the cloud. In this case, the cloud must operate on the encrypted data in order to maintain the confidentiality of the data.

Cryptographic techniques such as fully homomorphic encryption (FHE) enable arbitrary computations on the data that do not reveal any information about the data. However, the computations on data that has been encrypted through FHE suffer high computational costs. Furthermore, the effort to find a tradeoff is exponential in the number of control flow decisions. As a result, eliminating all data leakage through side channels increases runtime of the program. On the other hand, trusted execution environments (TEEs) require only little computational overhead, but are more vulnerable to side channel attacks. To further complicate matters, some applications have policies which require data attributes, variables, decisions, etc., to remain confidential.

BRIEF DESCRIPTION OF THE DRAWINGS

Features and advantages of the example embodiments, and the manner in which the same are accomplished, will become more readily apparent with reference to the following detailed description taken in conjunction with the accompanying drawings.

FIG. 2A is a diagram illustrating a control flow in which a subset of decisions are hidden from side channels in accordance with an example embodiment.

FIG. 5 is a diagram illustrating a method of determining one or more optimal variations of a software program in accordance with an example embodiment.

Figure 1:
FIG. 1 is a diagram illustrating a computing environment for generating optimal variations of a software program in accordance with an example embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various example embodiments. It should be appreciated that various modifications to the embodiments will be readily apparent to those skilled in the art, and the generic principles defined herein may be applied to other embodiments and applications without departing from the spirit and scope of the disclosure. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown but is to be accorded the widest scope consistent with the principles and features disclosed herein.

The example embodiments are directed to a system which can generate multiple variations of a software program with differing amounts of hidden (obscured) control flow statements. The system can measure security (e.g., bit leakage via side-channels, etc.) and performance (e.g., program running time, etc.) of the variations of the software program. Furthermore, the system can analyze the variations of the software program and identify one or more optimal variations of the program via a security and performance trade-off analysis. The analysis helps developers make decisions about which statements (decisions) within the control flow to hide and which to allow to be observed through side channels. Accordingly, the system can provide a set of variations of the program which include different pareto-optimal combinations of security and performance for software programs with varying policies, information flows, data, etc.

The security and performance trade-off analysis may be performed using various algorithms including a greedy heuristic algorithm and a genetic algorithm. In some cases, only one algorithm may be used or both algorithms may be used based on user choice. The better algorithm may depend on the size of the program, the speed at which the program is to be analyzed, and the like. Furthermore, the user (developer) may provide a predefined security policy of the software program which identifies certain variables, statements, etc., which must remain hidden. The variations may be generated and the analysis may be performed based on the predefined security policy.

For some software programs, meaningful security can only be achieved when all side channel exposure is eliminated. For example, cryptographic primitives such as square and multiply algorithms used for modular exponentiation in public key cryptography may require such security. In this case, if private key bits are leaked through side channels, all security relying on the secrecy of the private key is lost.

A broad class of side channels can be avoided by producing constant-time code that does not have memory accesses or control flow decisions based on secret data. However, for more complex operations, avoiding memory accesses or control flow decisions causes prohibitive performance gains. For example, Dantzig's simplex algorithm terminates as soon as objective values of a current solution can no longer be improved. It is extraordinarily efficient in practice but the worst-case running time is exponential in problem size. To eliminate side channels in this example, the system must also prevent a termination condition from leaking. This essentially creates an exponential gain to the running time.

Due to the prohibitive costs to runtime, eliminating all side channels can be impractical in many cases. The example embodiments provide a mechanism which can generate variations of a software program which include some side channel leakage and which also include some hidden control flow decisions. The system can identify which variations provide an optimal trade-off between security and performance. As a result, the system can automatically select control flow decisions to hide and control flow decisions which can be leaked saving a developer from making such selections manually. Here, the number of variations grows exponentially based on the number of control flow decisions which can be hidden. Thus, it can be impractical for a human to perform such a trade-off analysis. The trade-off analysis can identify one or more variations of a software program that are optimal in both security and performance with respect to all variations that are created by the system.

FIG. 1 illustrates a computing environment 100 for generating optimal variations of a software program 130 in accordance with an example embodiment. Referring to FIG. 1, a user may develop a software program 130 via a user device 110 and upload an optimal variation 130K of the software program to a host system 120. Here, the user device 110 may include an integrated development environment (IDE), or the like, which allows a user to write/develop the software program 130. Furthermore, once developed, the user may connect to the host system 120 via a network to upload an executable file of the variation 130K of the developed software program. For example, the user device 110 may be a desktop computer, laptop, mobile device, tablet, server, etc., which is connected to the host system 120 via a network such as the Internet. The host system 120 may be a cloud platform, a web server, a database, and the like. The software program 130 may be written in a programming language such as Java, or the like.

Within the software program 130 may be a control flow. The control flow is an order in which programming statements, instructions, function calls, and the like, of the software program 130 are executed or evaluated. Within the control flow may be various decisions. For example, a decision (also referred to as a transition, etc.) is a programming statement that results in a choice being made as to which of two or more paths to follow within the control flow. An example of a decision is shown and described with respect to FIG. 2B. Some examples of decisions within a control flow include "if" statements, "while" statements, "for" loops, "break" statements, "continue" statements, and other conditions.

According to various embodiments, the user device 110 may include a software tool therein (e.g., embedded within the IDE, etc.) which can perform a security and performance trade-off analysis. The software tool may identify a list of decisions within the control flow of the software program 130. Here, the user device 110 may generate multiple variations of the software program 130 in which different subsets of decisions are hidden and different subsets are exposed to side channels. The result of such variations is differing levels of security and performance. Furthermore, the software tool may measure security of each of the variations and measure a performance value such as running time of each of the variations. Then, the software tool may perform a security and performance trade-off analysis which identifies one or more optimal variations of the software program that include pareto-optimal values for security and performance.

In the example of FIG. 1, the software tool identifies a subset of variations of the software program 130 that have an optimum trade-off between security and performance. In this example, the optimum subset of variations include variations 130C, 130F, and 130K. The optimum subset of variations 130C, 130F, and 130K, may include different trade-offs between security and performance. The user of the user device 110 may select which variation (e.g., variation 130K, etc.) to send to the host system 120. Although the host system 120 is shown separate from the user device 110, it should be appreciated that all the features of the example embodiments may be embodied in a single device which includes the logic for performing the security and performance trade-off analysis, and the user environment for generating the software program. Furthermore, it is not necessary that the software tool be embedded within an IDE. As another example, the software tool may be a standalone service or embedded within another software application.

FIG. 2A illustrates an example of a control flow of a software program 200 in which some decisions are hidden from side channels in accordance with an example embodiment. Referring to FIG. 2A, the software program 200 includes source code that has a plurality of decisions 211-219. The decisions 211-219 are program statements in which a program choice is made. Each choice may represent a selection between two or more different paths within the software application. In some case, the decisions 211-219 may include variables that are operated on. When determining the different variations of the software program 200, the host system (e.g., host system 120 in FIG. 1) may selectively obscure/hide various decisions 211-219 of the software program 200. For example, the decisions 211-219 may include if/then statements, while statements, continue statements, break statements, for loops, and the like.

Each variation of the software program 200 may include a different subset of hidden decisions. In the variation of the software program 200 illustrated in FIG. 2A, decisions 211, 214, 217, and 218 are hidden while decisions 212, 213, 215, 216, and 219 are left exposed to side channels. It should be appreciated that "exposure" to side channels does not necessarily mean the entire decision content is made available to side channels. In some cases, the decision may be represented with a predetermined number of bits (e.g., 64 bits, etc.) and the leakage may be measured using bits. For example, if an observer is able to determine that a variable is not zero (e.g., it must be greater than or less than zero), this may be referred to as 1 bit of data being exposed to side channels out of 64 possible bits. The more data of a decision that can be observed/obtained, the more bits are revealed.

Not all program data is equally sensitive. Therefore, revealing data from one decision to a side channel may not be equal to revealing data from another decision to a side channel. Furthermore, a user may provide a security policy which specifies certain decisions/variables which must remain hidden. The selection of which decisions 211-219 to hide may be based on the security policy such that each variation satisfies the security policy.

According to various embodiments, a trade-off for the software program 200 may be determined based on the different variations of the software program 200 in which different subsets of decisions 211-219 are hidden and different subsets are revealed. Because the number of variations of the software program grow exponentially based on the number of decisions in the control flow, and not all decisions have the same impact on security, it is impractical for a user to make such selections manually. The analysis performed by the host system described herein helps developers determine which of the decisions 211-219 to reveal and which to hide. In the variation of the software program 200 shown in FIG. 2A, a security value 222 which represents a bit leakage amount of this variation of the software program 200 that can be measured by the host system. Furthermore, a performance value 224 represents a runtime of this variation of the software program 200. The security value 222 and the performance value 224 will change by changing which decisions 211-219 are revealed and which are hidden. As further described with reference to FIG. 3, the security value 222 and the performance value 224 may be measured using subroutines that are triggered by the host system during the trade-off analysis.

Figure 2B:
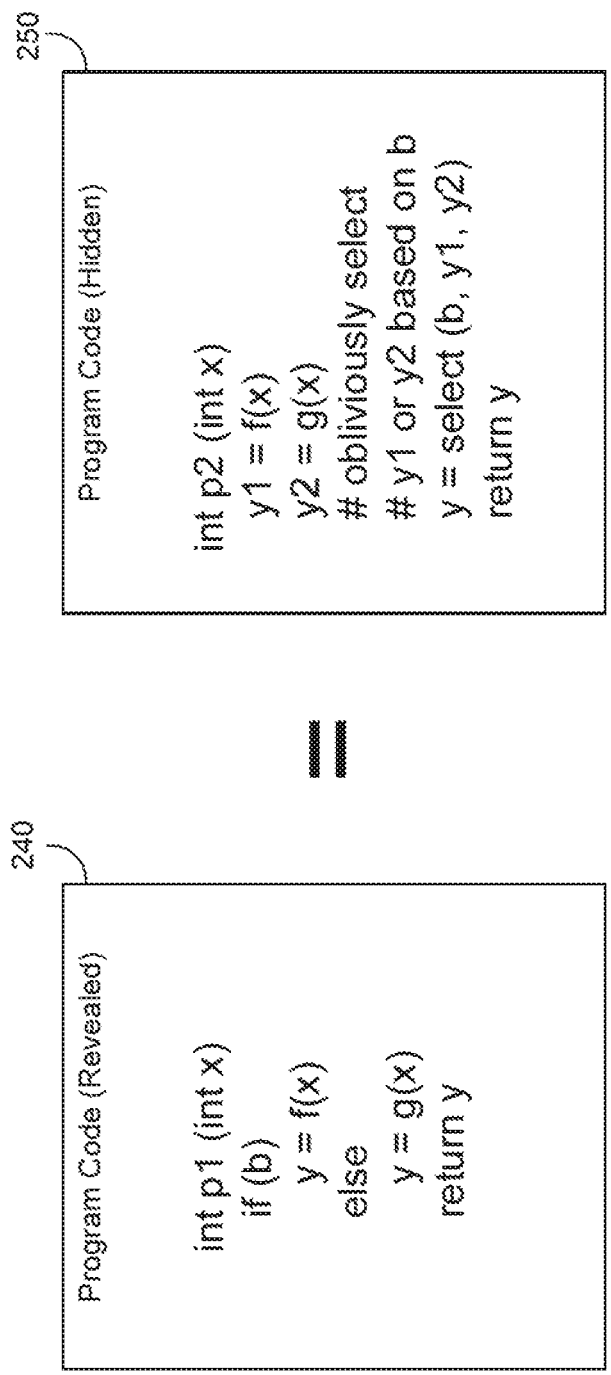
FIG. 2B is a diagram illustrating a process of converting exposed program code into a hidden program code in accordance with an example embodiment.

FIG. 2B is a diagram that illustrates a process 200B of converting exposed program code 240 into a hidden program code 250 in accordance with an example embodiment. Referring to FIG. 2B, the exposed program code 240 includes the program code of a decision within a control flow of a program. For example, the program code 240 may represent decision 211 shown in FIG. 2A. In this example, the program code 240 includes a Boolean result of a conditional expression 'e' which is revealed to an attacker capable of observing the executed control flow. Based on a result of 'e', only 'f' or 'g' is computed. The decision of selecting 'f' or 'g' is observable from the program code 240.

Meanwhile, the hidden program code 250 may be generated by converting the program code 240 into a semantic equivalent which does not reveal the decision. For example, the host system may rewrite the program code 240 into the form of the hidden program code 250. In this case, the hidden program code 250 computes both 'f' and 'g' and combines the result by invoking an oblivious select function. However, no control flow decisions are observable because the attacker does not learn the result of 'e'. Rather, the select statement obscures this feature from a side channel. Thus, a security value of the hidden program code 250 will be greater than a security value of the program code 240. However, the drawback of the hidden program code 250 is that the system has to perform $c(f)+c(g)$ computations. In contrast, when executing the program code 240 the system only has to perform the max of $c(f)$, $c(g)$ computations. As a result, the hidden program code 250 can have a longer runtime (worse performance value).

Figure 3:
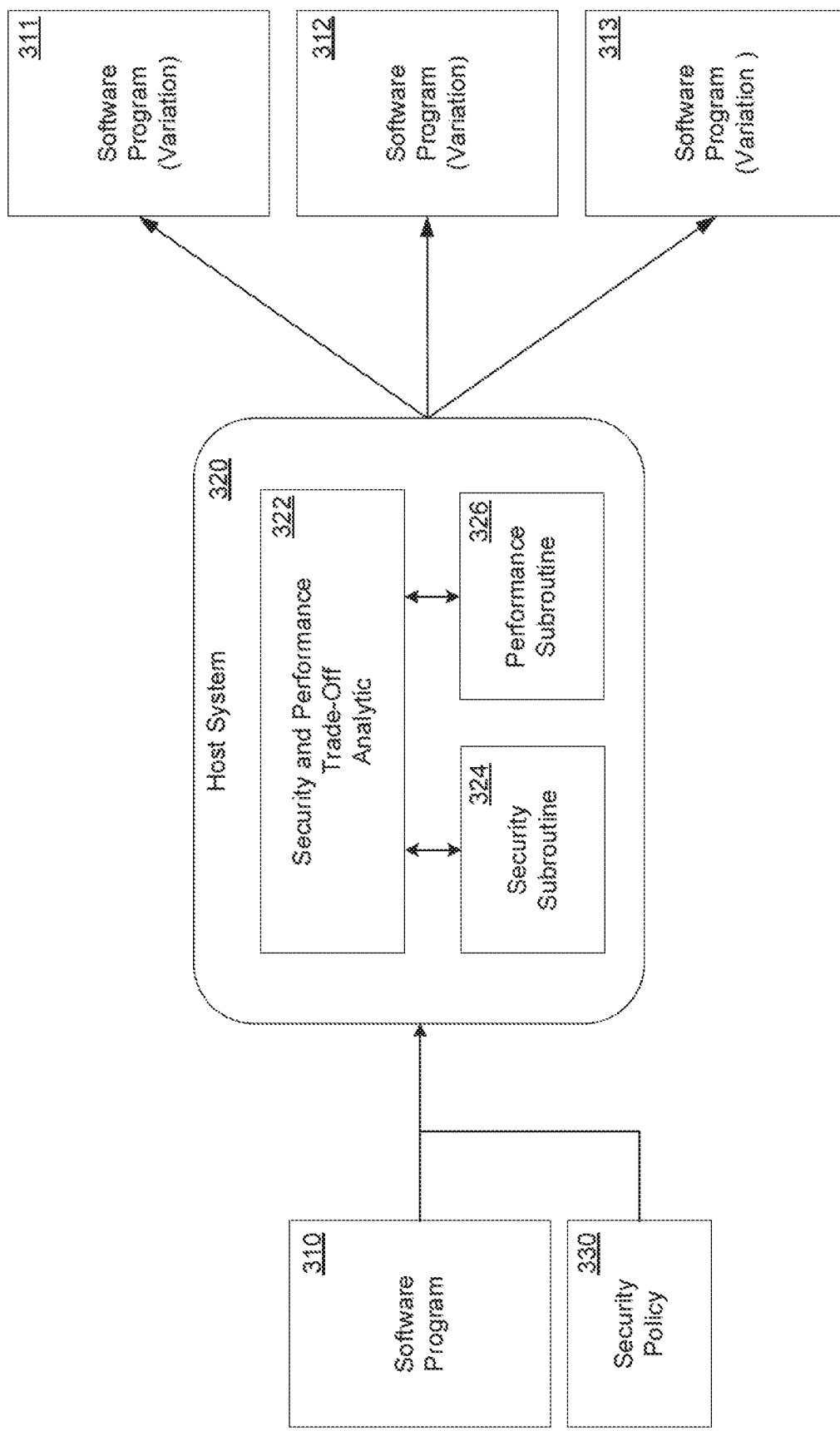
FIG. 3 is a diagram illustrating a process of performing a security and performance trade-off analysis in accordance with an example embodiment.

FIG. 3 illustrates a process 300 of performing a security and performance trade-off analysis in accordance with an example embodiment. Referring to FIG. 3, a host system 320 includes an analytic algorithm 322 that performs a security and performance trade-off analysis of a plurality of variations of a software program 310. For example, the host system 320 may be a user device, a server, a database, a cloud platform, or the like. The host system 320 may generate the plurality of variations. Here, the host system 320 may begin with an all-hidden program code in which no bits are leaked through side channels. The host system 320 may then reveal decisions in an incremental fashion to generate the variations. However, other search methods are also possible. For example, the host system 320 could begin with some decisions hidden and some decisions revealed. In some embodiments, the host system 320 may receive a security policy 330 which specifies one or more decisions, variables, and the like, which must remain hidden. Here, the host system 320 may generate the variations in consideration of the decisions, etc., which must remain hidden.

The host system 320 may execute the different variations. Here, the analytic algorithm 322 may perform a security and perform trade-off analysis of the different variations based on the conditions within the security policy 330. Furthermore, during runtime, a security subroutine 324 may measure an amount of bits that are leaked by a variation and a performance subroutine 326 may measure a runtime of the variation. The security value and the performance value may be fed to the analytic algorithm 322 for performing the trade-off analysis. As further described below, the analytic algorithm 322 may be a greedy heuristic which identifies one or more pareto-optimal variations of the software program 310. As another example, the analytic algorithm 322 may be a genetic algorithm which identifies one or more pareto-optimal variations of the software program 310.

In this example, the host system 320 may output information to a user device about three optimal variations of the software program (variations 311, 312, and 313). Here, the host system 320 may output the code, the metrics (security and performance values), and the like. Thus, a developer can receive the suggested code changes and the reasons for the suggested code changes.

The analytic system described herein may include processes that can measure security and performance. The security values and the performance values may be determined through cost functions. For example, a security metric may measure an amount of data bit leakage observed from an executed program. For example, the performance metric may be the running time of a program variation. The adversary model may learn the initial state of the program. The adversary model describes the capabilities of an adversary, and, against which kind of adversaries the program can be protected.

To evaluate the security of a program, the system may rely on established quantitative information flow (QIF) techniques and information theory. The QIF analysis may be decomposed into two steps including algebraic interpretation followed by a numerical evaluation. Then, the system may capture the view of the adversary model as an equivalent relation on the initial states of the program. Then, the system can quantize the equivalence relation to arrive at a numeric value expressing the adversarial information flow when executing the program.

The system may use a numerical metric such as an entropy calculation to quantify how many bits can be observed from a predefined amount of bits. The resulting metric may include a measurement, in bits, of the average information flow of leakage from the program during its execution. The system may model the information flow of the program to an observer resulting from execution of the program as an equivalence relation in the program's initial states. Two states are equivalent if an observer of the control flow cannot distinguish between them. The higher the number of equivalence classes and the smaller the classes, the more information is revealed to the attacker. In the extreme case of a single set, an observer cannot distinguish between any of the states and thus does not learn any information. On the other hand, if the observation yields singleton sets, the attacker has perfect knowledge of the initial states.

Meanwhile, a performance metric may measure a time it takes to run the software program. The security metric and the performance metric may be implemented as subroutines. It should also be appreciated that any security metric and performance metric may be used as is known in the art.

Figure 4A:
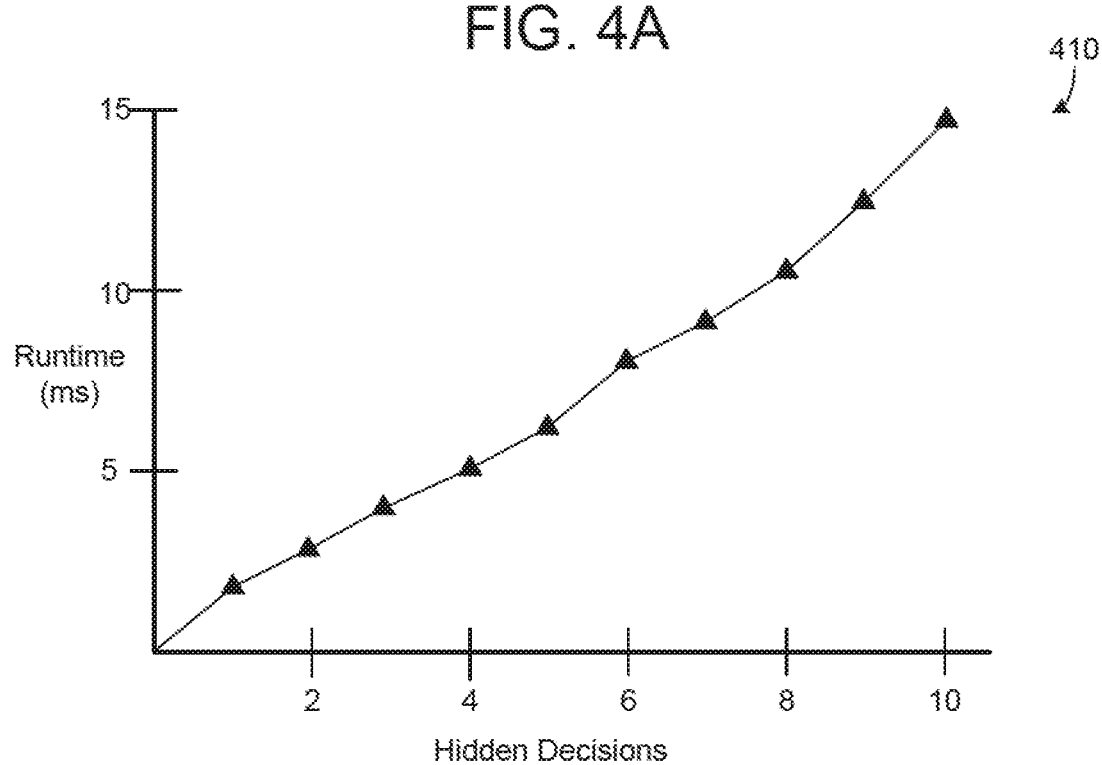
FIGS. 4A-4C are diagrams illustrating graphs of security and performance of program variations in accordance with example embodiments.
Figure 4B:
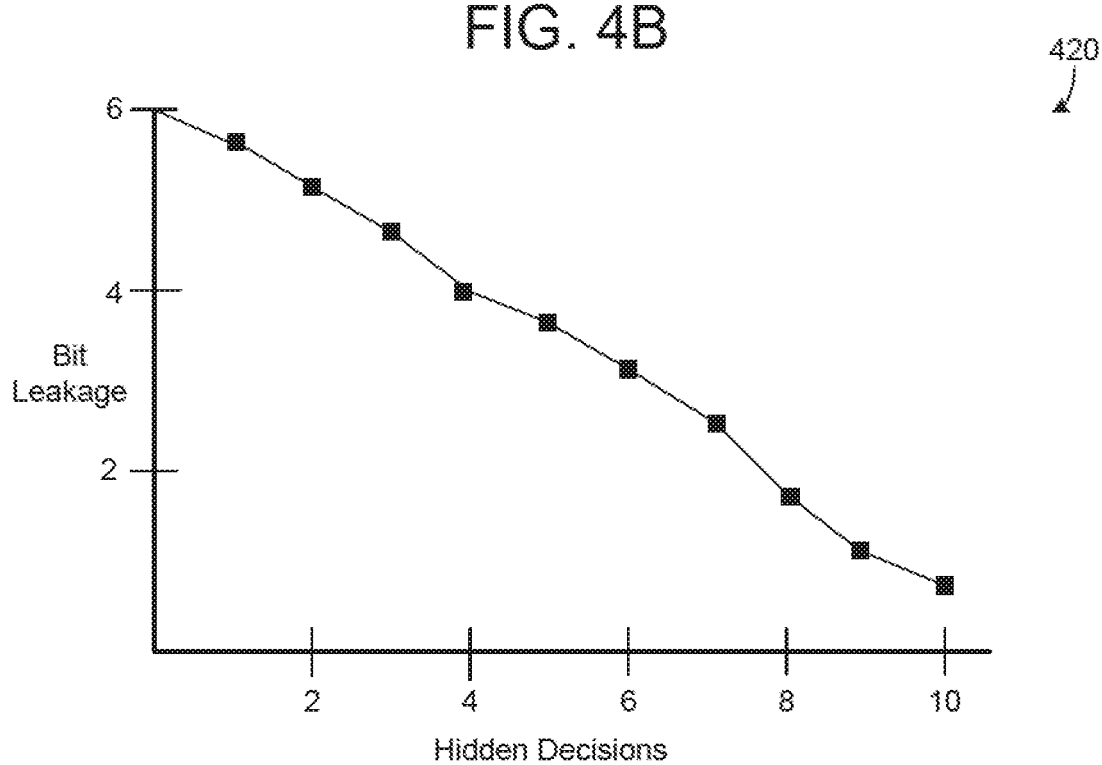
Figure 4C:
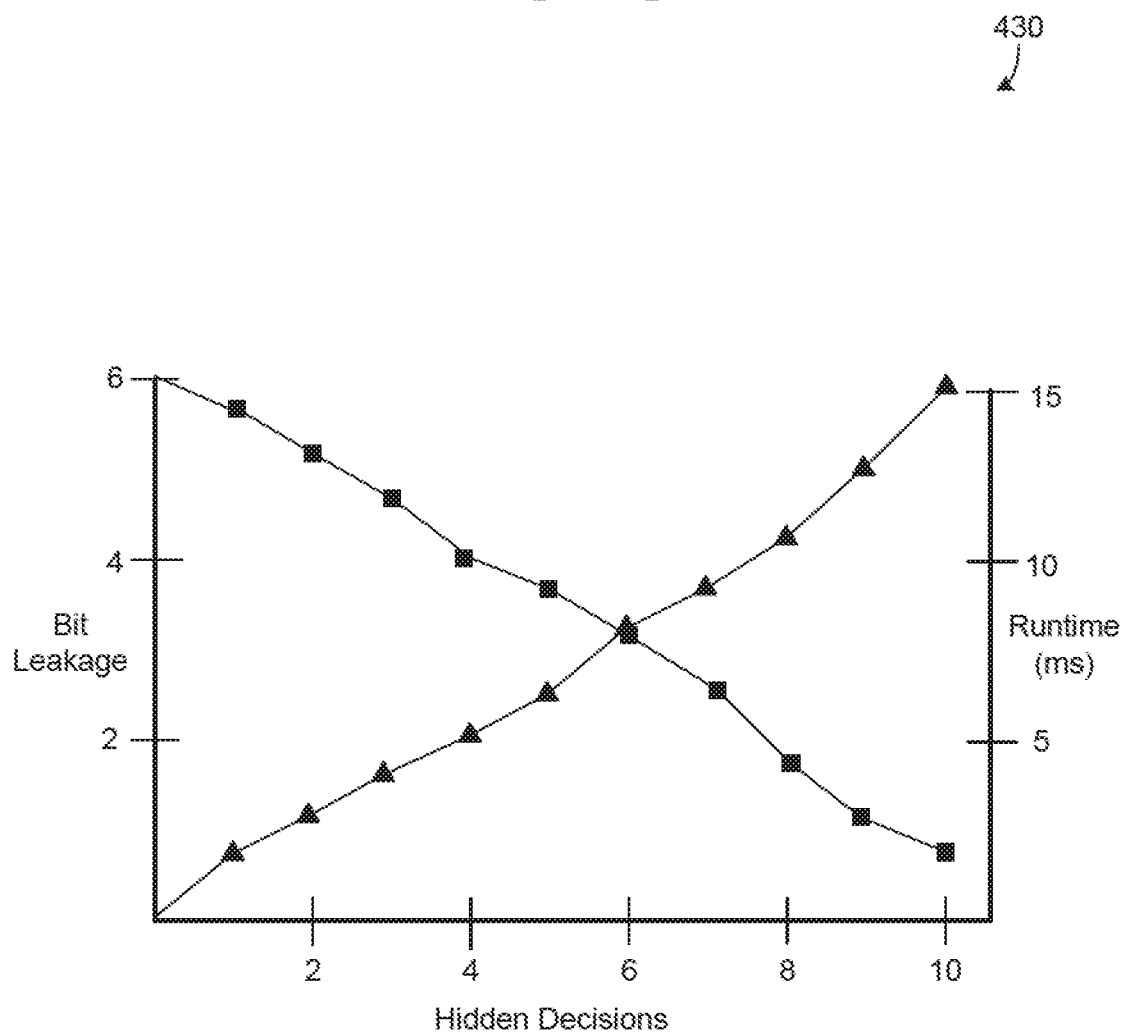

FIGS. 4A-4C illustrate graphs 410, 420, and 430, of security and performance values of program variations in accordance with example embodiments. Referring to FIG.

4A, the graph 410 illustrates a graph of a performance value (runtime) with respect the number of decisions that are hidden within a program. As can be seen from the graph 410, the more decisions that are hidden, the greater the runtime. Meanwhile, the graph 420 illustrates a graph of bit leakage with respect to the number of decisions that are hidden within the program. As can been seen from the graph 420, the bit leakage decrease as more decisions are concealed. The graph 420 is a special case of a program where the removal of each control flow decision results in a similar amount of security increment and a similar amount of performance loss. This is generally not the case since different control flow decision have different implications for security and performance. Furthermore, the graph 430 illustrates the graph 410 overlaid on the graph 420. Identifying a pareto-optimal solution may identify optimal values for both bit leakage and runtime. In this example, every solution is a pareto-optimal solution. Here, pareto-optimality is achieved if there is no other solution with a strict better (i.e., lower) value in at least one dimension and no other dimension with a worse (i.e., higher) value. Accordingly, a solution is pareto-optimal if it not dominated by another solution (i.e., another solution is not strictly better). The graph 430 does not show a whole space of solutions but rather a subset of solutions that provides the impressions of different trade-offs which are all pareto-optimal.

In some embodiments, the system may identify leakage in order to support qualitative information flow policies. A qualitative information flow policy specifies, for each program variable, whether or not information flow to an observer is tolerated when the program is executed. For example, a taint flow analysis may be performed to determine whether a program complies with a qualitative information flow policy. For example, a program P associated with a policy $\Phi$. The system may construct a taint flow analysis in which control flow transitions (decisions) are sinks in the taint flow analysis. From $\Phi$ the system may construct the set of initially tainted variables. Taint can then be spread to other variables. The analysis returns a set of flows as tuples (v, $\tau$) consisting of a tainted source variable 'v' and a sink transition '$\tau$'. In this example, P complies with $\Phi$ if and only if the analysis outputs an empty set.

As another example, the system may consider whether the program is compliant with a quantitative information flow policy if an adversarial flow of the program does not exceed the quantitative information flow policy for any variable. Here, the quantitative information flow policy may define an upper bound an adversarial information flow for the variable, and the system may use a worst-case information flow measure.

It is possible that a program P may initially violate a given quantitative information flow policy $\Psi$. In this case, the system may transform the program into a variation that does comply with the quantitative information flow policy $\Psi$. In this case, if the program does not comply with $\Psi$ there exists a variable in which the adversarial information flow to an observer exceeds a predefined threshold for the variable. In order for P to be compliant, the adversarial information flow for the variable must be decreased by removing control flow statements such as shown in the example of FIG. 2B. The control flow removal algorithm may rewrite the program code in such a way that disguises, or otherwise conceals a decision within the program code.

Next, the system may perform a security-performance trade-off analysis. In some embodiments, the combination of decisions (e.g., hidden, revealed, hidden, hidden, revealed, etc.) for a given variation can be interpreted as a specific selection of such a trade-off. The specific selection is represented as a binary vector (t) in the equations below. The problem of finding the transitions corresponding to a complying program with optimal security and performance can be expressed as an optimization problem with the following optimization function.

$$f(t) = \begin{pmatrix} \mu_s & (T(P, t)) \\ \mu_p & (T(P, t)) \end{pmatrix} \qquad \text{Equation 1}$$

In more detail, the system may determine the argument minimum for the cost function f(t) such that the program T (P, t) complies with the quantitative information flow policy $\Psi$. This describes the transformation of the original program P with respect to a binary vector t in the following manner. If the i-th entry of t is 0, the i-th control flow decision is removed. Otherwise, the new program still contains this decision. Formally:

$$\begin{aligned} &\arg\min \ f(t) &&\text{Equation 2}\\ &\text{s.t.} \quad T(P, t) \text{ is compliant with } \Psi \\ &\quad t \in \{0, 1\}^{|T|} \end{aligned}$$

Since f has multiple objects, solving this optimization problem may not yield a single optimal solution but a set of pareto-optimal solutions. The system may output the solutions in the set in ascending order with respect to $\mu_p$.

The first analysis algorithm for performing the security and performance trade-off analysis is a greedy heuristic algorithm. The greedy heuristic algorithm provides a fast/efficient convergence. The starting point of the greedy heuristic is a transformation of an initial program not containing any revealed control flow decisions. In other words, all decisions are hidden. This is referred to as the all-hidden program. This program is obviously compliant with the quantitative information flow policy $\Psi$ because it does not entail any adversarial information flow at all. Based on the all-hidden program, the system may iteratively reveal control flow decisions until revealing any more decisions would result in non-compliance with the quantitative information flow policy $\Psi$. By incrementally revealing control flow decisions, the system gradually obtains policy-compliant programs with better performance and less security.

The greedy heuristic may receive as input a program P and a quantitative information flow policy $\Psi$ and output a non-dominated set of programs P. The algorithm, as a heuristic, only provides an approximation of the actual solution. In each iteration step, the heuristic may consider a base program, starting with the all-hidden program in the first step, and a bit vector set B corresponding to programs with one additional control flow transition revealed. The system may filter any policy-compliant and non-dominated programs and add its corresponding bit vector to the current bit vector set B. The greedy heuristic algorithm terminates if every program is non-compliant or dominated by a program of the solution set or if there is no more transition to reveal. Each program corresponding to an element of B is added to the solution set. One of these programs is randomly chosen as a base for the next iteration step. Filtering non-dominated programs is achieved by a subroutine that outputs the maximum subset of non-dominated programs.

Instead of starting with the all-hidden program and revealing control flow decisions, the system may start with an all-revealed program, i.e., the original program, and remove control flow transitions. However, this may be more difficult. For example, it is unlikely that the all-revealed program is already policy-compliant. Therefore, the system must somehow establish policy-compliance by investigating other program variants. In doing so, a large number of non-compliant programs may have to investigated.

As another example, the policy-based security and performance trade-off analysis may be performed using a genetic algorithm. For example, the genetic algorithm may include a heuristic approach for solving an optimization problem based on a genetic meta-heuristic. Genetic algorithms do not require any a priori knowledge about the structure of the search space, thus they fit the problem described in the example embodiments very well. In contrast to the greedy heuristic, a whole set of not necessarily policy-compliant solutions, the so-called population, is considered and used to generate new solutions via the genetic algorithm.

For example, the fittest individuals, i.e. binary vectors of size T, from the population may be selected according to a fitness function. Based on the selected individuals, by using so-called crossing and mutation, new individuals are generated which replace the least fittest individuals in the population. This procedure is repeated until a sufficiently large amount of non-dominated solutions have been found or a running time bound has been reached. The genetic algorithm may use a population size of N that is determined by the developer. The algorithm outputs, for a program P, and a quantitative information flow policy $\Psi$, a non-dominated set of policy-compliant programs of size at most N. Since genetic algorithms may converge to one solution, to obtain a wide selection of solutions for the developer, the genetic algorithm uses niching methods.

In this example, a fitness function F is based on a ranking which takes policy-compliance into account. To an individual i the algorithm may assign $F_i:=N-k$ if it is dominated by k individuals in the current population. If a program is not policy-compliant, the algorithm may assign $F_i:=0$ to penalize such solutions and prefer complying programs. Furthermore, in the context of genetic algorithms, each component of an individual is referred to as a gen. Two individuals may be crossed by switching the first half of the of genes of the parents. For those individuals, mutation is applied based on a probability of the inverse of the population size.

In some embodiments, a niching method may be used. The niching may be recommended for multi-objective optimization. If two individuals of a population are in a same niche, (i.e., their distance is below a threshold sharing parameter $\sigma$) their fitness is shared. In this example, an unambiguous solution may be represented by Equation 3.

$$\sigma = \frac{M_1 + M_2 - (m_1 + m_2)}{N-1} \qquad \text{Equation 3}$$

In this example, M1, M2, m1, and m2 are scalars that are computed once in the beginning of the algorithm. They represent the bounds of the search space. Here, the system may approximate the bounds of the search space using that properties of two well-known programs. An all-revealed program will have a high leakage but good performance while an all-hidden program will have no leakage but poor performance. By determining the distance of two points, the system does not weight the influence of one dimension over another, because they may have different scales. Instead, the system may standardize both dimensions with respect to the maximum values of the programs above. This may lead to the following parameters shown below in Equation 4.

$$M_1 := \frac{\mu_s(P)}{\mu_s(P)} = 1 \quad m_1 := \frac{\mu_s(\hat{P})}{\mu_s(P)} = 0 \qquad \text{Equation 4}$$

$$M_2 := \frac{\mu_p(\hat{P})}{\mu_p(\hat{P})} = 1 \quad m_2 := \frac{\mu_p(P)}{\mu_p(\hat{P})} = 0$$

Where $\mu_s$ describes the security measure, $\mu_p$ the performance measure and $\hat{P}$ the all hidden program. Where In the following, the system may denote the scale factor as shown in Equation 5.

$$S := \left(\frac{1}{\mu_s(P)}, \frac{1}{\mu_p(\hat{P})}\right)^T \qquad \text{Equation 5}$$

The fitness is now shared with other individuals in the same niche. Here, the system may define the sharing function as shown in Equation 6.

$$sh: [0, inf] \to [0, 1] \qquad \text{Equation 6}$$

With $$sh(d) := \begin{cases} 1 - \frac{d}{\sigma}, & \text{if } d < \sigma \\ 0, & \text{otherwise} \end{cases}$$

Where d describes a metric of two points in the search space. A Euclidean distance metric may be used as shown below in Equation 7. Based on the simple fitness function, the system defines a shared fitness function F. T takes as arguments an individual 'i' and a matrix 'M' which contains the individuals of the population as columns.

$$F'(i, M) := \frac{F_i}{\sum_{j=1}^{N} sh(d(f(M_{:,i}) \circ S, f(M_{:,j}) \circ S))}$$

Based on the shared fitness function, the evolution process is repeated until a maximum number of iterations is reached or a convergence criterion is fulfilled. The system may use a maximum allowable pareto percentage as a conversion criterion. Here, the algorithm terminates if the percentage of non-dominated individuals in a current population exceeds a user defined threshold.

FIG. 5 illustrates a method 500 of determining one or more pareto-optimal variations of a software program in accordance with an example embodiment. For example, the method 500 may be performed by a software program such as an application, a service, or other program that is executing on a cloud platform, a server, a database node, a computing system (user device), a combination of devices/nodes, or the like. Referring to FIG. 5, in 510, the method may include identifying a set of decisions within a control flow of a software program. For example, the decisions may include "if" statements, "while" statements, "break" statements, and the like, which correspond to choices within a program between different paths.

In 520, the method may include generating a plurality of variations of the software program which comprise different subsets of decisions which are partially exposed to side channels, respectively, and which satisfy a predetermined security specification of the software program. The variations may include different subsets of hidden decisions and exposed decisions. Here, the exposure of a decision does not necessarily reflect exposing all of the program code. Instead, the exposure may be represented on a scale of bits where different levels of information can be obtained representing different amounts of bits being leaked. In some embodiments, the generating may include converting code fragments of a decision within the control flow into semantically equivalent code that does not identify a result of the decision. In some embodiments, the converting may include combining bitwise operations of a decision with a constant-time conditional assignment operation. In some embodiments, the decisions may include conditional instructions within source code of the software program which execute on encrypted data.

In 530, the method may include determining one or more pareto-optimal variations of the software program based on side channel leakage values and performance values of the plurality of variations of the software program. Furthermore, in 540, the method may include outputting information about the one or more pareto-optimal variations of the software program to a user device.

In some embodiments, the determining may be performed via a greedy heuristic which identifies one or more pareto-optimal variations of the software program based on the side channel leakage values and the performance values. In some embodiments, the determining may be performed via a genetic algorithm which determines one or more pareto-optimal variations of the software program based on the side channel leakage values and the performance values. In some embodiments, the determining may include determining the one or more optimal variations of the software program based on implementation of a predefined security policy of the software program which requires one or more predefined decisions to be hidden. For example, a side channel leakage value of a variation of the software program may represent how many bits are exposed through a side channel. As another example, a performance value of a variation of the software program represents a run time of the variation.

Figure 6:
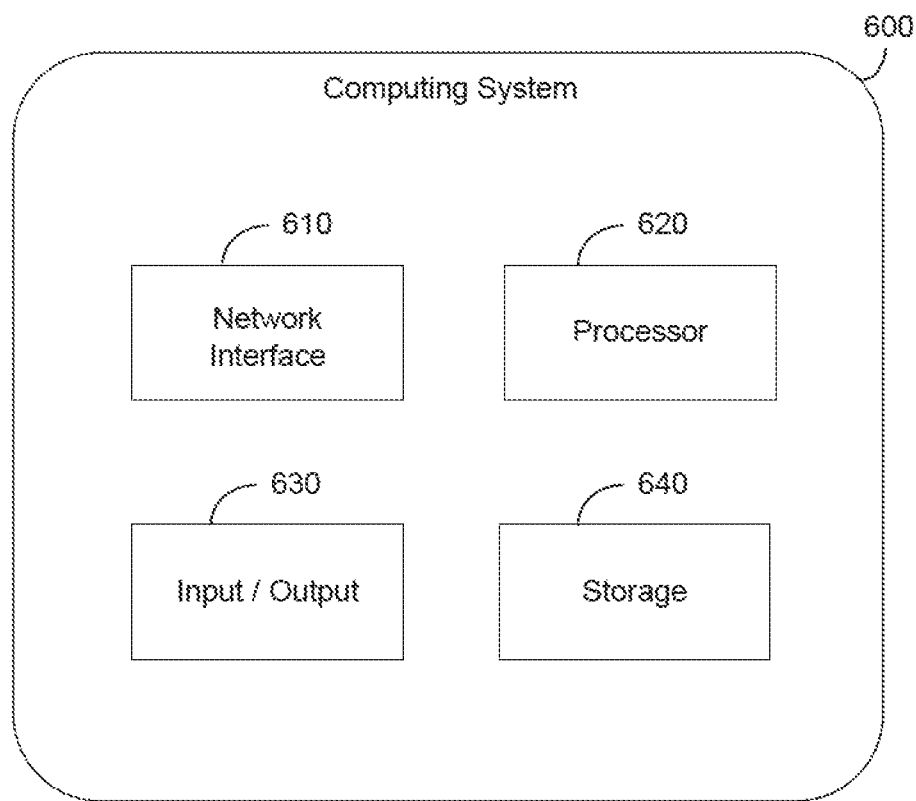
FIG. 6 is a diagram illustrating a computing system for use in the examples herein in accordance with an example embodiment.

FIG. 6 illustrates a computing system 600 that may be used in any of the methods and processes described herein, in accordance with an example embodiment. For example, the computing system 600 may be a database node, a server, a cloud platform, or the like. In some embodiments, the computing system 600 may be distributed across multiple computing devices such as multiple database nodes. Referring to FIG. 6, the computing system 600 includes a network interface 610, a processor 620, an input/output 630, and a storage device 640 such as an in-memory storage, and the like. Although not shown in FIG. 6, the computing system 600 may also include or be electronically connected to other components such as a display, an input unit(s), a receiver, a transmitter, a persistent disk, and the like. The processor 620 may control the other components of the computing system 600.

The network interface 610 may transmit and receive data over a network such as the Internet, a private network, a public network, an enterprise network, and the like. The network interface 610 may be a wireless interface, a wired interface, or a combination thereof. The processor 620 may include one or more processing devices each including one or more processing cores. In some examples, the processor 620 is a multicore processor or a plurality of multicore processors. Also, the processor 620 may be fixed or it may be reconfigurable. The input/output 630 may include an interface, a port, a cable, a bus, a board, a wire, and the like, for inputting and outputting data to and from the computing system 600. For example, data may be output to an embedded display of the computing system 600, an externally connected display, a display connected to the cloud, another device, and the like. The network interface 610, the input/output 630, the storage 640, or a combination thereof, may interact with applications executing on other devices.

The storage device 640 is not limited to a particular storage device and may include any known memory device such as RAM, ROM, hard disk, and the like, and may or may not be included within a database system, a cloud environment, a web server, or the like. The storage 640 may store software modules or other instructions which can be executed by the processor 620 to perform the method shown in FIG. 5. According to various embodiments, the storage 640 may include a data store having a plurality of tables, partitions and sub-partitions. The storage 640 may be used to store database records, items, entries, and the like. In some embodiments, the storage 640 may be configured to store instructions for managing a configuration repository for a distributed system.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non-transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, external drive, semiconductor memory such as read-only memory (ROM), random-access memory (RAM), and/or any other non-transitory transmitting and/or receiving medium such as the Internet, cloud storage, the Internet of Things (IoT), or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus, cloud storage, internet of things, and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps. Although the disclosure has been described in connection with specific examples, it should be understood that various changes, substitutions, and alterations apparent to those skilled in the art can be made to the disclosed embodiments without departing from the spirit and scope of the disclosure as set forth in the appended claims.

What is claimed is:

1. A computing system comprising:
a storage configured to store a set of statements within a control flow of a software program; and
a processor configured to
generate a plurality of variations of the software program which comply with a quantitative information flow policy that defines an upper bound of an adversarial information flow for one or more variables in the software program, wherein the plurality of variations comprise a plurality of different subsets of statements within the control flow which are exposed to side channels, respectively,
execute the plurality of variations of the software program, wherein the processor is further configured to measure side channel leakage values of the plurality of variations during execution of the plurality of variations and record performance values of the execution of the plurality of variations, respectively,
determine one or more pareto-optimal variations of the software program based on the side channel leakage values and the performance values of the plurality of variations of the software program, and
output information about the one or more pareto-optimal variations of the software program to a user device.

2. The computing system of claim 1, wherein the processor is configured to convert code fragments of a statement within the control flow into semantically equivalent code that does not identify a result of the statement.

3. The computing system of claim 2, wherein the processor is configured to combine bitwise operations of a statement with a constant-time conditional assignment operation.

4. The computing system of claim 1, wherein the processor is configured to generate the plurality of variations by selectively modifying different conditional instructions within source code of the software program to execute on encrypted data in each variation.

5. The computing system of claim 1, wherein the processor is configured to generate the plurality of variations by incrementally revealing control flow statements from an all-hidden control flow until revealing another control flow statement does not comply with the upper bound of the adversarial information flow.

6. The computing system of claim 1, wherein a performance value of a variation of the software program represents an execution time of the variation.

7. The computing system of claim 1, wherein the processor is configured to determine the one or more pareto-optimal variations via a greedy heuristic which identifies the one or more pareto-optimal variations of the software program based on the side channel leakage values and the performance values.

8. The computing system of claim 1, wherein the processor is configured to determine the one or more pareto-optimal variations via a genetic algorithm which determines the one or more pareto-optimal variations of the software program based on the side channel leakage values and the performance values.

9. The computing system of claim 1, wherein the processor is further configured to determine the one or more pareto-optimal variations of the software program based on implementation of a predefined security policy of the software program which requires one or more predefined statements to be hidden.

10. A method comprising:
identifying a set of statements within a control flow of a software program;
generating a plurality of variations of the software program which comply with a quantitative information flow policy that defines an upper bound of an adversarial information flow for one or more variables in the software program, wherein the plurality of variations comprise a plurality of different subsets of statements of the control flow which are exposed to side channels, respectively;
executing the plurality of variations of the software program, and measuring, via a processor, side channel leakage values of the plurality of variations during execution of the plurality of variations and recording performance values of the execution of the plurality of variations, respectively;
determining one or more pareto-optimal variations of the software program based on the side channel leakage values and the performance values of the plurality of variations of the software program; and
outputting information about the one or more pareto-optimal variations of the software program to a user device.

11. The method of claim 10, wherein the generating comprises converting code fragments of a statement within the control flow into semantically equivalent code that does not identify a result of the statement.

12. The method of claim 11, wherein the converting comprises combining bitwise operations of a statement with a constant-time conditional assignment operation.

13. The method of claim 10, wherein the generating further comprises selectively modifying different conditional instructions within source code of the software program to execute on encrypted data in each variation.

14. The method of claim 10, wherein the generating comprises generating the plurality of variations by incrementally revealing control flow statements from an all-hidden control flow until revealing another control flow statement does not comply with the upper bound of the adversarial information flow.

15. The method of claim 10, wherein a performance value of a variation of the software program represents an execution time of the variation.

16. The method of claim 10, wherein the determining is performed via a greedy heuristic which identifies the one or more pareto-optimal variations of the software program based on the side channel leakage values and the performance values.

17. The method of claim 10, wherein the determining is performed via a genetic algorithm which determines the one or more pareto-optimal variations of the software program based on the side channel leakage values and the performance values.

18. The method of claim 10, wherein the determining comprises determining the one or more pareto-optimal variations of the software program based on implementation of a predefined security policy of the software program which requires one or more predefined statements to be hidden.

19. A non-transitory computer-readable medium comprising instructions which when executed by a processor cause a computer to perform a method comprising:

identifying a set of statements within a control flow of a software program;

generating a plurality of variations of the software program which comply with a quantitative information flow policy that defines an upper bound of an adversarial information flow for one or more variables in the software program, wherein the plurality of variations comprise a plurality of different subsets of statements of the control flow which are exposed to side channels, respectively;

executing the plurality of variations of the software program, and measuring, via a processor, side channel leakage values of the plurality of variations during execution of the plurality of variations and recording performance values of the execution of the plurality of variations, respectively;

determining one or more pareto-optimal variations of the software program based on the side channel leakage values and the performance values of the plurality of variations of the software program; and outputting information about the one or more pareto-optimal variations of the software program to a user device.

20. The non-transitory computer-readable medium of claim 19, wherein the generating comprises converting code fragments of a statement within the control flow into semantically equivalent code that does not identify a result of the statement.

* * * * *